(12) United States Patent
Ghoneima et al.

(10) Patent No.: US 7,817,068 B2
(45) Date of Patent: Oct. 19, 2010

(54) LOW POWER SERIAL LINK BUS ARCHITECTURE

(75) Inventors: Maged Ghoneima, Evanston, IL (US); Muhammad M. Khellah, Tigard, OR (US); Vivek K. De, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 470 days.

(21) Appl. No.: 11/428,247

(22) Filed: Jun. 30, 2006

(65) Prior Publication Data

US 2008/0001793 A1    Jan. 3, 2008

(51) Int. Cl.
*H03M 5/00*    (2006.01)
(52) U.S. Cl. .................... 341/55; 341/100; 341/101
(58) Field of Classification Search ............. 341/100, 341/101, 55; 709/231; 714/758
See application file for complete search history.

(56) References Cited

U.S. PATENT DOCUMENTS

| | | | | |
|---|---|---|---|---|
| 6,556,152 | B2* | 4/2003 | Pitio et al. ............ | 341/101 |
| 7,117,419 | B2* | 10/2006 | Nemawarkar et al. ....... | 714/758 |
| 2003/0120791 | A1* | 6/2003 | Weber et al. ............ | 709/231 |

OTHER PUBLICATIONS

International Technology Roadmap for Semiconductors 1999 Edition, 126 pgs.

Anders, M., et al., "A transition-encoded dynamic bus technique for high-performance interconnects", *IEEE Journal of Solid-State Circuits*, 38(5), (May 2003),709-714.
Durkan, C., et al., "Size effects in the electrical resistivity of polycrystalline nanowires", *Phys. Rev. B*, 61(20), (2000),14215-14218.
Ghoneima, M., et al., "Serial-link bus: a low-power on-chip bus architecture", *IEEE/ACM International Conference on Computer-Aided Design*, 2005. ICCAD-2005., (2005),541-546.
Kumar, Rajesh, "Interconnect and noise immunity design for the Pentium 4 processor", *Annual ACM IEEE Design Automation Conference, Proceedings of the 40th conference on Design Automation*, (2003),938-943.
Shin, Youngsoo, et al., "Coupling-driven bus design for low-power application-specific systems", *Annual ACM IEEE Design Automation Conference, Proceedings of the 38th Conference on Design Automation*, (Jun. 18-22, 2001),750-753.
Sotiriadis, P P., et al., "Bus energy minimization by transition pattern coding (TPC) in deep sub-micron technologies", *IEEE/ACM International Conference Computer Aided Design*, 2000. ICCAD-2000, (2000),322-327.

* cited by examiner

*Primary Examiner*—Jean B Jeanglaude
(74) *Attorney, Agent, or Firm*—Schwegman, Lundberg & Woessner, P.A.

(57) ABSTRACT

Embodiments of the present invention provide a bus architecture utilizing multiple-pumped serial links, and a combination of encoding and serialization to two data streams to transmit and receive a serialized data stream over a bus. The order in which encoding and serialization takes place depends upon the anticipated activity factors of the two data streams, and is chosen to reduce average energy dissipation. Other embodiments are described and claimed.

15 Claims, 2 Drawing Sheets

LOW POWER SERIAL LINK BUS ARCHITECTURE

FIELD

Embodiments of the present invention relate to circuits, and more particularly, to a bus in a computer or microprocessor system.

BACKGROUND

A bottleneck in microprocessor design is the use of long on-chip buses. In deep sub-micron process technology, the aspect ratio for intermediate wire layers is 2.0 or above. This indicates that as wire pitch decreases and interconnect aspect ratio increases, the lateral component of interconnect capacitance (coupling capacitance), which may be from three to five times as much as the vertical component of interconnect capacitance, will likely continue to grow so as to dominate the total interconnect capacitance of a bus. Interconnect capacitance affects bus delay and power dissipation.

In addition to capacitance effects, it has been shown that the resistance of interconnects may increase significantly when the lateral dimensions of the interconnects (width and height) are scaled to the sub-100 nanometer regime. This is due to the scattering processes of the conduction electrons at the external interfaces, e.g. interconnect surfaces, and at the internal interfaces, e.g., grain boundaries in the interconnects.

In addition to reducing the capacitance and resistance of buses, it may also be desirable to provide for a bus architecture that helps mitigate the effect of capacitance and resistance upon bus delay and power dissipation.

It has been shown that a significant savings in power (or energy) dissipation may be achieved if the number of bus lines is reduced by one-half, while keeping the same bus area and double-pumping each interconnect (serial link), e.g., multiplexing each two bits on one interconnect. This is discussed in M. Ghoneima, et al., "Serial Link Bus: A Low Power On-Chip Bus Architecture," Proceedings of the ICCAD, November 2005. A reason for this reduction power dissipation is that if the number of bus interconnects is halved, where the same bus area is maintained, then the line pitch almost doubles. This increase in pitch allows an increase in the interconnect spacing and (or) the interconnect width, which in turn reduces the interconnect capacitance and (or) resistance. More generally, there may be a reduction in power dissipation where the number of bus lines is divided by an integer divisor, d, and the data pumping is increased by a factor equal to d, where d may be greater than two.

In order for the d-pumped bus to maintain the same throughput of the conventional parallel line bus, d bits must be transmitted within the same clock period on each interconnect. Thus, the interconnect delay of the d-pumped bus must be d times less than that of the conventional parallel-line bus. Simulations have shown that the relative reduction in serial link delay may be greater than the factor d, leading to an overall throughput increase. For example, simulations have shown that by halving the number of bus lines and double-pumping the data, the relative reduction in serial link delay is much better than 50%, and this is expected to further improve as technology scales to smaller dimensions (because $C_C/C_G$ increases as technology scales). This indicates that a double-pumped serial-link with a line pitch double that of a conventional static bus may be structured to have a higher throughput. If, however, the throughput of the serial-link bus is to be kept the same as that of a conventional bus, then the extra reduction in delay (the delay slack) can be used to reduce the number of repeaters and their relative sizes. As a result, the reduction in repeater capacitance, together with the reduced serial-link capacitance, leads to an overall energy reduction when compared to a conventional static bus.

It is useful to provide a bus architecture with a further reduction in power dissipation.

The average activity factor of a line AF represents the probability that a line will switch from high to low or vice versa within a clock cycle. Each line in a conventional parallel line bus transmits one bit during each cycle, so the average activity factor of this line can vary between 0 and 1. However, as a line in a d-pumped bus serializes d bits in the same clock cycle, the average activity factor of a d-pumped line varies between 0 and d. For example, a double-pumped line will vary between 0 and 2

DESCRIPTION OF EMBODIMENTS

Before describing the embodiments, it is useful to discuss the energy dissipation and coupling capacitance of a bus.

The delay of an interconnect is a strong function of its total capacitance, $C_T$, which is the sum of the line-to-ground capacitance, load capacitance, and the coupling capacitance. This may be expressed for an interconnect indexed by the index i as $$C_T(i) = C_G(i) + \sum_j M(i;\ j) C_C(i;\ j),$$

where $C_T(i)$ is the total capacitance for interconnect i, $C_G(i)$ represents the line-to-ground and load capacitance for interconnect i, $C_C(i;\ j)$ is the coupling capacitance between interconnect i and interconnect j, $M(i;\ j)$ is the Miller coupling factor between interconnects i and j. The sum over the index j such that interconnect j is a neighbor to interconnect i.

The Miller coupling factor between any two neighboring interconnects depends on their relative switching activity. For two oppositely switching neighboring interconnects, the Miller coupling factor is approximately 2, whereas if only one interconnect is switching and the other neighbor is quiet, the Miller coupling factor is approximately 1. For two similarly switching neighboring interconnects, the Miller coupling factor is approximately 0.

The average dynamic energy dissipation of bus interconnect i, $E_{DYN}(i)$, may be written as follows:

$$E_{DYN}(i) = 0.5 AF(i) C_T V_{DD}^2$$
$$= 0.5 AF\left(C_G(i) + \sum_j M(i; j) C_C(i; j)\right) V_{DD}^2,$$

where $V_{DD}$ is a rail voltage, e.g., a supply voltage. The activity factor AF is 1 if the interconnect is switching, and is 0 if it is quiet.

If two data streams with activity factors $0<AF_1<1$ and $0<AF_2<1$ are multiplexed onto a serial link, it can be shown that the activity factor for the multiplexed data stream, $AF_S$, is $AF_S=1$, irrespective of the transition probabilities for the two individual data streams.

Transition encoding is a technique that has been proposed in M. Anders, et al., "A Transition-Encoded Dynamic Bus Technique for High-Performance Interconnects," IEEE Journal of Solid-State Circuits, Vol. 38, May 2003, pp. 709-714. This encoding technique XORs the input data to the line with the data value already transmitted on the line.

It can be shown that if the data is transition encoded after being serialized (multiplexed) using a simple XOR (exclusive OR), the resulting activity factor is $2AF_1(1-AF_1)+2AF_2(1-AF_2)$.

It can also be shown that if the data is transition encoded before being serialized (multiplexed) using a simple XOR, the resulting activity factor is the sum of the individual line activity factors $AF_1+AF_2$.

Figure 1:
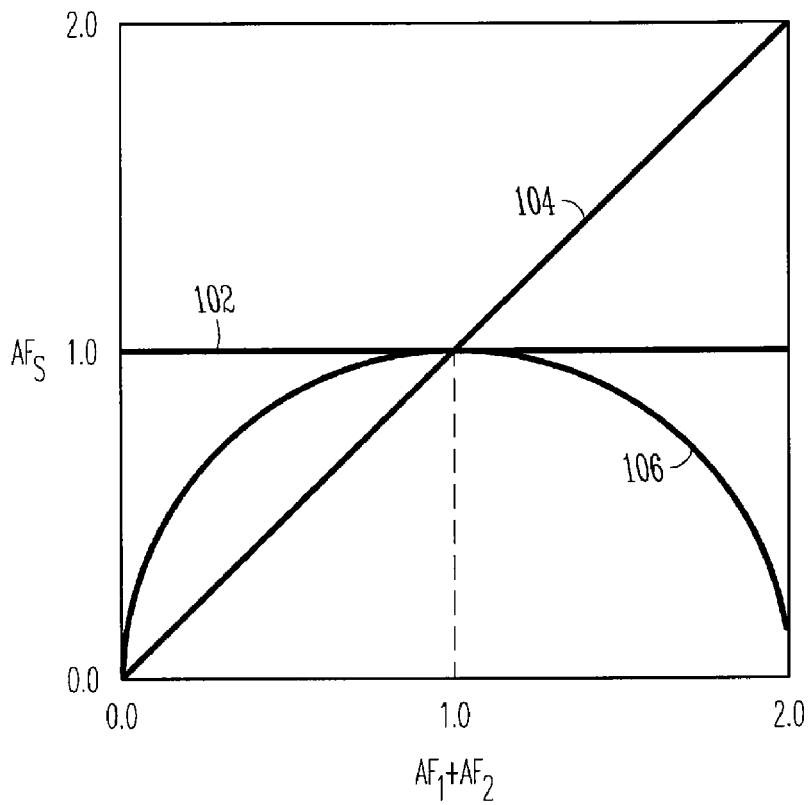
FIG. 1 illustrates plots of the activity factor of a serial data stream formed from two data streams.

From the equation for the average dynamic energy dissipation, $E_{DYN}$, displayed in [0019], it is seen that the average dynamic energy is reduced if the activity factor is reduced. With this in mind, embodiments of the present invention are motivated by considering the various plots in FIG. 1 for the activity factor of a serialized data stream formed from two data streams. The x-axis in FIG. 1 is the sum of the activity factors for the two data streams, $AF_1+AF_2$, and the y-axis is the activity factor, $AF_S$, for the serialized data stream formed from the two data streams. The different plots represent different schemes for combining the two data streams.

Plot 102 represents the activity factor $AF_S$ in which only serialization is performed. That is, the two data streams are multiplexed onto a single serial link without encoding. As discussed above, the activity factor for this scheme is simply $AF_S=1$. Plot 104 is for the scheme in which serialization is followed by encoding. Plot 106 is for the scheme in which serialization encoding is performed before serialization (multiplexing).

Figure 2:
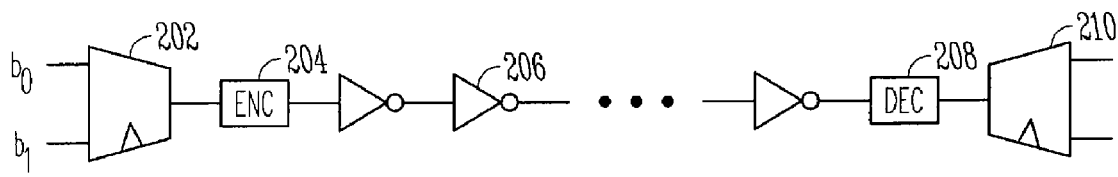
FIG. 2 illustrates an embodiment of the present invention for the case in which the activity factors of the two data streams sum to less than 1.

From the plots in FIG. 1, it is seen that if the activity factors of a line-pair (two data streams) are such that their sum is less than 1, then transition encoding is applied after serialization. This scheme is illustrated in FIG. 2, where two data streams $b_0$ and $b_1$ are serialized by multiplexer (or serializer) 202, and the resulting multiplexed data stream is then encoded by encoder 204. Encoder 204 may be a simple XOR applied to the multiplexed data stream. More particularly, if one represents the multiplexed data stream (before encoding) by the time series x(n) and the encoded serialized data stream as $x_E(n)$, where n is a time index, then encoding the time series x(n) involves forming the XOR of x(n) and $x_E(n-1)$. That is, if the, then $$x_E(n)=XOR\{x(n)x_E(n-1)\}=(x(n)\cap\overline{x_E(n-1)})\cup(\overline{x(n)}\cap x_E(n-1)).$$

The interconnect in FIG. 2 is shown with various repeaters, indicated by label 206. Decoder 208 performs the inverse of encoder 204 to recover the serialized data stream, and de-multiplexer (de-serializer) 210 recovers the two data streams $b_0$ and $b_1$ (assuming that such factors as noise, inter-symbol interference, etc., does not introduce errors.) For simplicity, a separate bus driver is not shown, but may be considered as part of encoder 204. Similarly, a separate bus receiver is not shown, but may be considered as part of decoder 208.

Figure 3:
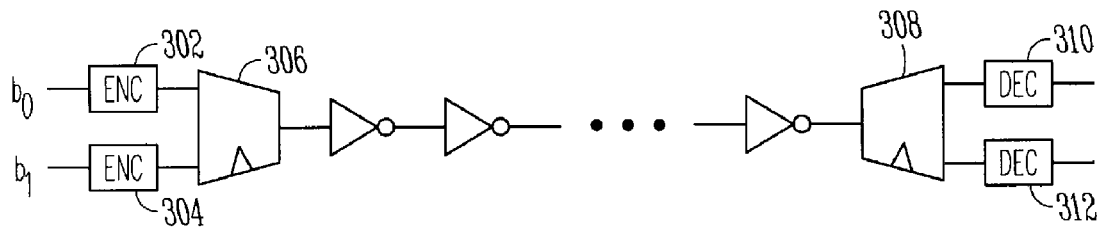
FIG. 3 illustrates an embodiment of the present invention for the case in which the activity factors of the two data streams sum to greater than 1.

From the plots of FIG. 1, it is seen that if the activity factors of a line-pair are such that their sum is greater than 1, then encoding is performed before serialization. This scheme is illustrated in FIG. 3, where the two data streams are first each encoded by encoder 302 and encoder 304, followed by serialization by multiplexer 306. Upon reception, the serialized data stream is de-serialized by de-multiplexer 308, and then the resulting data streams are decoded by decoder 310 and decoder 312. Either scheme, either FIG. 2 or FIG. 3, may be employed for the case in which the activity factors sum to 1.

Figure 4:
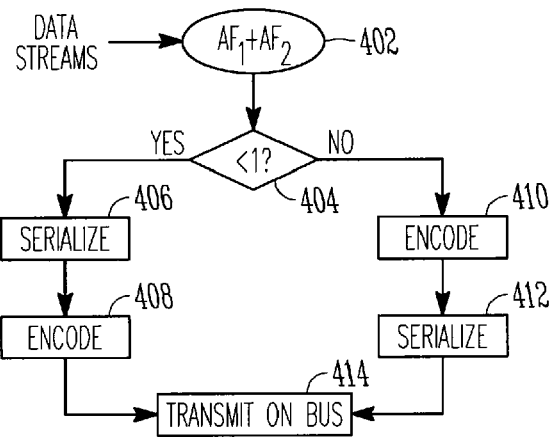
FIG. 4 illustrates a flow diagram according to an embodiment of the present invention.

The above description may be illustrated by the flow diagram of FIG. 4. In block 402, the activity factors for the two data streams are summed, or in practice, estimated, and in block 404 a determination is made as to whether this sum is less than 1. If the sum is less than 1, then the order of blocks 406 and 408 indicate that serialization is performed before encoding, whereas otherwise encoding is performed before serialization as indicated by the order of blocks 410 and 412. The resulting serialized data stream is then transmitted over the bus, as indicated in block 414.

Figure 5:
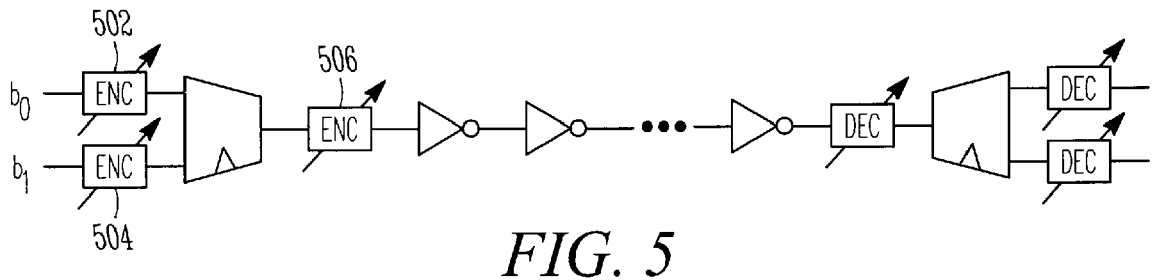
FIG. 5 illustrates an embodiment combining the features of FIGS. 2 and 3 according to an embodiment of the present invention.

The circuit diagrams indicated in FIGS. 2 and 3 may be combined into the circuit diagram of FIG. 5, where encoders are programmable such that they either encode or simply pass their input signal through to their output port. Similar remarks apply to the decoders in FIG. 5. For example, if the activity factors are known, estimated, or measured to sum to less than 1, then encoders 502 and 504 are set so that they pass their input through unchanged, and encoder 506 is set so that it encodes its input. If the activity factors are known, estimated, or measured to sum to greater than 1, then encoders 502 and 504 are set so that they encode, whereas encoder 506 is set so that it passes its input through unchanged. Similar remarks apply to the decoders.

In addition to employing the various schemes as indicated in the above drawings and discussed above, the dimensions of the serial links may be designated by assigning different line pitches p according to their activity factors, where p=w+s, where w is the interconnect width and s denotes the spacing between two adjacent interconnects. Conventional buses are usually designed with minimum width and minimum spacing to save metal area, resulting in interconnects having the same pitch, width, spacing, and hence the same line capacitance. By employing the embodiments as described above into the same bus area as a conventional bus, the available serial link pitch is greater than that of a conventional bus because there are now half the number of interconnects occupying the same area. Thus, if the activity factors of the bus lines are known a priori, greater line pitch may be allocated to those serial links having higher activity factors.

Figure 6:
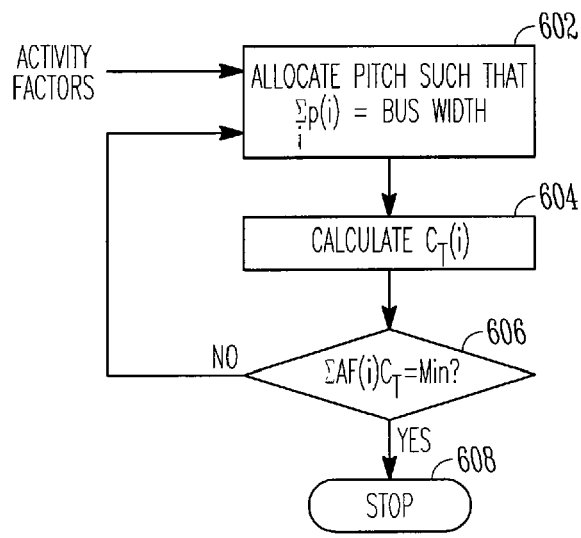
FIG. 6 illustrates a flow diagram for allocating pitch according to activity factors according to an embodiment of the present invention.

The increased line pitch results in reduced capacitance. Hence, the pitch of each serial link may be selected such that the sum of the pitches is equal to the available bus width, and such that the sum $$\sum_i AF(i)C_T(i)$$

is minimized, while maintaining the same conventional bus throughput. This may be illustrated by the flow diagram of FIG. 6, where given the activity factors, block 602 chooses a set of pitches p(i) over the index i such that the sum $$\sum_i p(i)$$

equals the available bus width. By choosing the set of pitches, the capacitances $C_T(i)$ may be calculated in block 604. A criterion of goodness may be invoked in block 606 to determine if the sum $$\sum_i AF(i)C_T(i)$$

is minimized or is close to minimum. If further iterations are needed to reduce this sum, then a new set of pitches may be chosen in block 602. Various numerical techniques, such as the method of steepest decent, for example, may be invoked to iterate on the set of chosen pitches. Eventually, a criterion of goodness may be satisfied by which the sum $$\sum_i AF(i)C_T(i)$$

does not change much for a new iterations, in which case the procedure indicated by the flow diagram of FIG. 6 stops, as indicated in 608.

The design of a double-pumped serial link is relatively straightforward, and does not require an extra clock signal with double the system frequency because both edges of the system clock may be used. Furthermore, double-pumped serial links may also be used for multi-cycle buses by using intermediate double-edged trigger flip-flops, with the first stage containing the serializer and the last stage containing the de-serializer. It should also be noted that time borrowing may be applied to serial link buses in a manner similar to that of applying it to conventional static buses.

Figure 7:
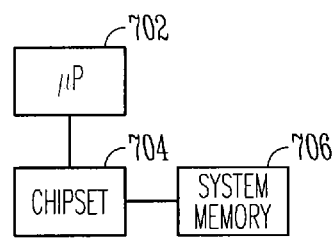
FIG. 7 illustrates a portion of a computer system in which embodiments of the present invention may find application.

Embodiments of the present invention are expected to find applications to, but not necessarily limited to, computer systems. In particular, a microprocessor with one or more cores may utilize relatively long buses for one component of the microprocessor to communicate with another component. Such microprocessors may be part of a computer system, as illustrated in FIG. 7. FIG. 7 illustrates a portion of a computer system employing microprocessor 702, chipset 704, and system memory 706. Chipset 704 may comprise one or more chips, or may be integrated or partially integrated with microprocessor 702. Chipset 704 handles various communication functions, including communication with microprocessor 702 and system memory 706. Embodiments of the present invention may find applications in microprocessor 702, chipset 704, or both, as well as other components making up a computer system.

Various modifications may be made to the disclosed embodiments without departing from the scope of the invention as claimed below.

It is to be understood in these letters patent that the meaning of "A is connected to B", where A or B may be, for example, a node or device terminal, is that A and B are connected to each other so that the voltage potentials of A and B are substantially equal to each other. For example, A and B may be connected by way of an interconnect. In integrated circuit technology, the interconnect may be exceedingly short, comparable to the device dimension itself. For example, the gates of two transistors may be connected to each other by a polysilicon or copper interconnect that is comparable to the gate length of the transistors. As another example, A and B may be connected to each other by a switch, such as a transmission gate, so that their respective voltage potentials are substantially equal to each other when the switch is ON.

It is also to be understood in these letters patent that the meaning of "A is coupled to B" is that either A and B are connected to each other as described above, or that, although A and B may not be connected to each other as described above, there is nevertheless a device or circuit that is connected to both A and B. This device or circuit may include active or passive circuit elements, where the passive circuit elements may be distributed or lumped-parameter in nature. For example, A may be connected to a circuit element that in turn is connected to B.

It is also to be understood in these letters patent that various circuit blocks, such as current mirrors, amplifiers, etc., may include switches so as to be switched in or out of a larger circuit, and yet such circuit blocks may still be considered connected to the larger circuit because the various switches may be considered as included in the circuit block.

Various mathematical relationships may be used to describe relationships among one or more quantities. For example, a mathematical relationship or mathematical transformation may express a relationship by which a quantity is derived from one or more other quantities by way of various mathematical operations, such as addition, subtraction, multiplication, division, etc. Or, a mathematical relationship may indicate that a quantity is larger, smaller, or equal to another quantity. These relationships and transformations are in practice not satisfied exactly, and should therefore be interpreted as "designed for" relationships and transformations. One of ordinary skill in the art may design various working embodiments to satisfy various mathematical relationships or transformations, but these relationships or transformations can only be met within the tolerances of the technology available to the practitioner.

Accordingly, in the following claims, it is to be understood that claimed mathematical relationships or transformations can in practice only be met within the tolerances or precision of the technology available to the practitioner, and that the scope of the claimed subject matter includes those embodiments that substantially satisfy the mathematical relationships or transformations so claimed.

What is claimed is:

1. An apparatus comprising:
   an interconnect;
   a first encoder to encode a first data stream into a first encoded data stream;
   a second encoder to encode a second data stream into a second encoded data stream;
   a serializer to serialize the first encoded data stream and the second encoded data stream into an encoded data stream, wherein the serializer is coupled to the interconnect so that the encoded data stream is transmitted on the interconnect, wherein the first encoder comprises an exclusive OR functional unit applied to the first data stream and a delayed version of the first encoded data stream; and the second encoder comprises an exclusive OR functional unit applied to the second data stream and a delayed version of the second encoded data stream, wherein the first data stream has a first activity factor and the second data stream has a second activity factor, wherein the sum of the first and second activity factors is not less than one.

2. An apparatus comprising:

an interconnect;

a first encoder to encode a first data stream into a first encoded data stream;

a second encoder to encode a second data stream into a second encoded data stream;

a serializer to serialize the first encoded data stream and the second encoded data stream into an encoded data stream, wherein the serializer is coupled to the interconnect so that the encoded data stream is transmitted on the interconnect, wherein the first data stream has a first activity factor and the second data stream has a second activity factor, wherein the sum of the first and second activity factors is not less than one.

3. An apparatus comprising:

an interconnect;

a first encoder to provide a first input data stream, wherein the first input data stream is an encoded version of a first data stream when the first encoder is set to a first state, and is a replica of the first data stream when the first encoder is set to a second state;

a second encoder to provide a second input data stream, wherein the second input data stream is an encoded version of a second data stream when the second encoder is set to a first state, and is a replica of the second data stream when the second encoder is set to a second state;

a serializer to serialize the first input data stream and the second input data stream into an input data stream; and a third encoder to provide an output data stream on the interconnect, wherein the output data stream is an encoded version of the input data stream when the third encoder is set to a first state, and is a replica of the input data stream when the third encoder is set to a second state;

wherein the first and second encoders are set in their respective first states when the third encoder is set in its respective second state, and wherein the first and second encoders are set in their respective second states when the third encoder is set in its respective first state.

4. The apparatus as set forth in claim 3, wherein the first data stream having a first activity factor and the second data stream having a second activity factor, wherein the first and second encoders are set in their respective first state when the sum of the first and second activity factors is not less than one, and wherein the first and second encoders are set in their respective second states when the sum of the first and second activity factors is not greater than one.

5. The apparatus as set forth in claim 4, wherein:

the first encoder comprises an exclusive OR functional unit to apply an exclusive OR on the first data stream and a delayed version of the first input data stream;

the second encoder comprises an exclusive OR functional unit to apply an exclusive OR on the second data stream and a delayed version of the second input data stream; and the third encoder comprises an exclusive OR functional unit to apply an exclusive OR on the input data stream and a delayed version of the output data stream.

6. The apparatus as set forth in claim 3, wherein:

the first encoder comprises an exclusive OR functional unit to apply an exclusive OR on the first data stream and a delayed version of the first data stream;

the second encoder comprises an exclusive OR functional unit to apply an exclusive OR on the second data stream and a delayed version of the second data stream; and the third encoder comprises an exclusive OR functional unit to apply an exclusive OR on the input data stream and a delayed version of the input data stream.

7. A method to transmit information on a bus indicative of a first data stream having a first activity factor and a second data stream having a second activity factor, the method comprising:

provided the sum of the first and second activity factors is not less than one, encoding the first data stream into a first encoded data stream, encoding the second data stream into a second encoded stream, serializing the first and second encoded data streams into an output data stream, and transmitting the output data stream on the bus; and provided the sum of the first and second activity factors is not greater than one, serializing the first and second data streams into an input data stream, encoding the input data stream into an encoded data stream, and transmitting the encoded data stream on the bus.

8. The method as set forth in claim 7, wherein the encoding comprises performing an exclusive OR function.

9. The method as set forth in claim 7, wherein the bus is double-pumped.

10. A computer system comprising:

system memory;

a chipset coupled to the system memory; and a processor coupled to the chipset, the processor comprising:

an interconnect;

a first encoder to provide a first input data stream, wherein the first input data stream is an encoded version of a first data stream when the first encoder is set to a first state, and is a replica of the first data stream when the first encoder is set to a second state;

a second encoder to provide a second input data stream, wherein the second input data stream is an encoded version of a second data stream when the second encoder is set to a first state, and is a replica of the second data stream when the second encoder is set to a second state;

a serializer to serialize the first input data stream and the second input data stream into an input data stream; and a third encoder to provide an output data stream on the interconnect, wherein the output data stream is an encoded version of the input data stream when the third encoder is set to a first state, and is a replica of the input data stream when the third encoder is set to a second state;

wherein the first and second encoders are set in their respective first states when the third encoder is set in its respective second state, and wherein the first and second encoders are set in their respective second states when the third encoder is set in its respective first state.

11. The computer system as set forth in claim 10, wherein the first data stream having a first activity factor and the second data stream having a second activity factor, wherein the first and second encoders are set in their respective first state when the sum of the first and second activity factors is not less than one, and wherein the first and second encoders are set in their respective second states when the sum of the first and second activity factors is not greater than one.

12. The computer system as set forth in claim 11, wherein:
the first encoder comprises an exclusive OR functional unit to apply an exclusive OR on the first data stream and a delayed version of the first input data stream;
the second encoder comprises an exclusive OR functional unit to apply an exclusive OR on the second data stream and a delayed version of the input second data stream; and
the third encoder comprises an exclusive OR functional unit to apply an exclusive OR on the input data stream and a delayed version of the output data stream.

13. The computer system as set forth in claim 10, wherein:
the first encoder comprises an exclusive OR functional unit to apply an exclusive OR on the first data stream and a delayed version of the first input data stream;
the second encoder comprises an exclusive OR functional unit to apply an exclusive OR on the second data stream and a delayed version of the second input data stream; and
the third encoder comprises an exclusive OR functional unit to apply an exclusive OR on the input data stream and a delayed version of the output data stream.

14. An apparatus comprising:
an interconnect;
a serializer to serialize a first data stream and a second data stream into a third data stream; and
an encoder to encode the third data stream into an encoded data stream, wherein the encoder is coupled to the interconnect so that the encoded data stream is transmitted on the interconnect, wherein the encoder comprises an exclusive OR functional unit applied to the third data stream and a delayed version of the encoded data stream on the interconnect, wherein the first data stream has a first activity factor and the second data stream has a second activity factor, wherein the sum of the first and second activity factors is not greater than one.

15. An apparatus comprising:
an interconnect;
a serializer to serialize a first data stream and a second data stream into a third data stream; and
an encoder to encode the third data stream into an encoded data stream, wherein the encoder is coupled to the interconnect so that the encoded data stream is transmitted on the interconnect, wherein the first data stream has a first activity factor and the second data stream has a second activity factor, wherein the sum of the first and second activity factors is not greater than one.

\* \* \* \* \*